(12) United States Patent
Coleman

(10) Patent No.: US 10,791,119 B1
(45) Date of Patent: Sep. 29, 2020

(54) METHODS FOR TEMPORAL PASSWORD INJECTION AND DEVICES THEREOF

(71) Applicant: F5 Networks, Inc., Seattle, WA (US)

(72) Inventor: Michael Coleman, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 237 days.

(21) Appl. No.: 15/713,138

(22) Filed: Sep. 22, 2017

Related U.S. Application Data

(60) Provisional application No. 62/470,909, filed on Mar. 14, 2017.

(51) Int. Cl.
    *H04L 29/06*    (2006.01)
    *G06F 21/41*    (2013.01)

(52) U.S. Cl.
    CPC ........ *H04L 63/0884* (2013.01); *H04L 63/083* (2013.01); *H04L 63/0815* (2013.01); *G06F 21/41* (2013.01)

(58) Field of Classification Search
    CPC ............. H04L 63/0884; H04L 63/0815; H04L 63/083; H04L 29/06; G06F 21/41
    USPC .... 726/2, 4, 5, 10, 17–19, 21; 713/155–156, 713/182–185
    See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |

(Continued)

FOREIGN PATENT DOCUMENTS

| | | | |
|---|---|---|---|
| CN | 104869175 A | * 8/2015 | ............ G06F 21/31 |
| EP | 0744850 A2 | 11/1996 | |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Saleh Najjar
*Assistant Examiner* — Khalid M Almaghayreh
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that receive a request from a client to log into an application hosted by an application server. A determination is made when the client is authenticated in response to the request. Attribute(s) are extracted from the request, when the determining indicates that the client is authenticated. A first password is generated for the client. A record for the client stored at a global catalog server is identified based on the extracted attributes and the generated first password is injected into the identified record. Credential(s) including at least the generated first password are sent to the application hosted by the application server. This technology advantageously facilitates hosting of applications that support password-based login in networks that do not allow password use even when application servers hosting the applications cannot be steered to particular directory services for authentication.

20 Claims, 4 Drawing Sheets

(56) References Cited

U.S. PATENT DOCUMENTS

| | | |
|---|---|---|
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,085,320 A | 7/2000 | Kaliski, Jr. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,223,287 B1 | 4/2001 | Douglas et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,535,912 B1 | 3/2003 | Anupam et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,552,199 B2 * | 6/2009 | Pomerantz ............ G06Q 10/06 709/219 |
| 7,558,197 B1 | 7/2009 | Sindhu et al. |
| 7,624,424 B2 | 11/2009 | Morita et al. |
| 7,757,278 B2 | 7/2010 | Boneh et al. |
| 7,788,730 B2 | 8/2010 | Dean et al. |
| 7,801,978 B1 | 9/2010 | Susai et al. |
| 7,857,002 B2 | 12/2010 | Reck |
| 7,916,728 B1 | 3/2011 | Mimms |
| 7,945,563 B2 | 5/2011 | Seltz |
| 7,966,553 B2 | 6/2011 | Iverson |
| 8,090,816 B1 | 1/2012 | Deshmukh et al. |
| 8,103,809 B1 | 1/2012 | Michels et al. |
| 8,112,491 B1 | 2/2012 | Michels et al. |
| 8,112,799 B1 | 2/2012 | Loidice et al. |
| 8,130,650 B2 | 3/2012 | Allen, Jr. et al. |
| 8,234,687 B2 | 7/2012 | Baumhof |
| 8,291,497 B1 | 10/2012 | Griffin et al. |
| 8,301,837 B1 | 10/2012 | Natarajan |
| 8,306,036 B1 | 11/2012 | Bollay |
| 8,346,993 B2 | 1/2013 | Michels et al. |
| 8,347,100 B1 | 1/2013 | Thornewell et al. |
| 8,356,352 B1 | 1/2013 | Wawda et al. |
| 8,447,884 B1 | 5/2013 | Baumann |
| 8,537,825 B1 | 9/2013 | Mimms |
| 8,554,999 B2 | 10/2013 | Natarajan |
| 8,578,482 B1 | 11/2013 | Yang et al. |
| 8,584,233 B1 | 11/2013 | Yang et al. |
| 8,601,586 B1 | 12/2013 | Boutros et al. |
| 8,769,681 B1 | 7/2014 | Michels et al. |
| 8,776,166 B1 * | 7/2014 | Erickson ............ H04L 12/4633 726/1 |

(56) References Cited

U.S. PATENT DOCUMENTS

| | | |
|---|---|---|
| 8,856,898 B1 | 10/2014 | Thornewell et al. |
| 8,880,632 B1 | 11/2014 | Michels |
| 8,880,696 B1 | 11/2014 | Michels |
| 8,886,981 B1 | 11/2014 | Baumann et al. |
| 8,984,178 B2 | 3/2015 | Michels et al. |
| 9,020,912 B1 | 4/2015 | Majee et al. |
| 9,083,760 B1 | 7/2015 | Hughes et al. |
| 9,098,678 B2* | 8/2015 | Hao .................. G06F 21/34 |
| 9,106,699 B2 | 8/2015 | Thornewell et al. |
| 9,141,625 B1 | 9/2015 | Thornewell et al. |
| 9,154,453 B2 | 10/2015 | Michels et al. |
| 9,231,879 B1 | 1/2016 | Wojcik |
| 9,246,819 B1 | 1/2016 | Thirasuttakorn |
| 9,294,502 B1 | 3/2016 | Benishti |
| 9,313,047 B2 | 4/2016 | Michels et al. |
| 9,444,808 B1* | 9/2016 | Sherman ............. G06F 21/31 |
| 9,444,839 B1* | 9/2016 | Faulkner ............. H04L 63/168 |
| 9,900,305 B2* | 2/2018 | Levergood ......... H04L 63/083 |
| 9,935,940 B1* | 4/2018 | DeMoss ............. H04L 63/1466 |
| 10,122,706 B2* | 11/2018 | Greenspan ......... H04L 63/0861 |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0208562 A1 | 11/2003 | Hauck et al. |
| 2003/0225485 A1 | 12/2003 | Fritz et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0144441 A1 | 6/2005 | Govindarajan |
| 2005/0154837 A1 | 7/2005 | Keohane et al. |
| 2005/0187866 A1 | 8/2005 | Lee |
| 2005/0188051 A1 | 8/2005 | Sneh |
| 2006/0005017 A1 | 1/2006 | Black et al. |
| 2006/0059267 A1 | 3/2006 | Cugi et al. |
| 2006/0075028 A1 | 4/2006 | Zager et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2006/0253581 A1 | 11/2006 | Dixon et al. |
| 2006/0259967 A1 | 11/2006 | Thomas et al. |
| 2007/0005984 A1 | 1/2007 | Florencio et al. |
| 2007/0016662 A1 | 1/2007 | Desai et al. |
| 2007/0016949 A1 | 1/2007 | Dunagan et al. |
| 2007/0039038 A1 | 2/2007 | Goodman et al. |
| 2007/0039050 A1 | 2/2007 | Aksenov et al. |
| 2007/0064661 A1 | 3/2007 | Sood et al. |
| 2007/0074169 A1 | 3/2007 | Chess et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0143851 A1* | 6/2007 | Nicodemus ......... H04L 63/105 726/25 |
| 2007/0156592 A1* | 7/2007 | Henderson .......... G06Q 20/40 705/51 |
| 2007/0169191 A1 | 7/2007 | Greene et al. |
| 2007/0174491 A1 | 7/2007 | Still et al. |
| 2007/0255953 A1 | 11/2007 | Peyret |
| 2007/0297551 A1 | 12/2007 | Choi |
| 2008/0010377 A1 | 1/2008 | Nissennboim |
| 2008/0034136 A1 | 2/2008 | Ulenas |
| 2008/0092242 A1 | 4/2008 | Rowley |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0208957 A1* | 8/2008 | Ding .................... H04L 9/3263 709/203 |
| 2008/0229427 A1* | 9/2008 | Ramirez ............... H04L 67/02 726/26 |
| 2008/0244724 A1 | 10/2008 | Choe |
| 2008/0256224 A1 | 10/2008 | Kaji et al. |
| 2008/0281983 A1 | 11/2008 | Cooley et al. |
| 2008/0289047 A1 | 11/2008 | Benea et al. |
| 2008/0301760 A1 | 12/2008 | Lim |
| 2008/0320567 A1 | 12/2008 | Shulman et al. |
| 2009/0049230 A1 | 2/2009 | Pandya |
| 2009/0064337 A1 | 3/2009 | Chien |
| 2009/0077383 A1 | 3/2009 | de Monseignat et al. |
| 2009/0106433 A1* | 4/2009 | Knouse ................ H04L 67/14 709/229 |
| 2009/0119769 A1 | 5/2009 | Ross et al. |
| 2009/0125625 A1 | 5/2009 | Shim et al. |
| 2009/0138749 A1 | 5/2009 | Moll et al. |
| 2009/0138937 A1 | 5/2009 | Erlingsson et al. |
| 2009/0141891 A1 | 6/2009 | Boyen et al. |
| 2009/0172396 A1 | 7/2009 | Gabel et al. |
| 2009/0182818 A1 | 7/2009 | Krywaniuk |
| 2009/0228956 A1 | 9/2009 | He et al. |
| 2009/0254994 A1 | 10/2009 | Waterson |
| 2009/0287935 A1 | 11/2009 | Aull et al. |
| 2009/0300749 A1 | 12/2009 | Liske |
| 2009/0319769 A1 | 12/2009 | Betouin et al. |
| 2010/0017880 A1 | 1/2010 | Masood |
| 2010/0023582 A1 | 1/2010 | Pedersen et al. |
| 2010/0100725 A1 | 4/2010 | Ozzie |
| 2010/0106767 A1 | 4/2010 | Livshits et al. |
| 2010/0107247 A1 | 4/2010 | Shani |
| 2010/0122091 A1 | 5/2010 | Huang et al. |
| 2010/0150154 A1 | 6/2010 | Viger et al. |
| 2010/0229223 A1* | 9/2010 | Shepard ............... H04L 67/02 726/5 |
| 2010/0251330 A1 | 9/2010 | Kroeselberg et al. |
| 2010/0257354 A1 | 10/2010 | Johnston et al. |
| 2010/0275014 A1 | 10/2010 | Kelley |
| 2010/0275024 A1 | 10/2010 | Abdulhayoglu |
| 2010/0281536 A1 | 11/2010 | Richards et al. |
| 2010/0281563 A1 | 11/2010 | Richards et al. |
| 2010/0313266 A1 | 12/2010 | Feng et al. |
| 2010/0325277 A1 | 12/2010 | Muthiah et al. |
| 2010/0333167 A1 | 12/2010 | Luo et al. |
| 2011/0047620 A1 | 2/2011 | Mahaffey et al. |
| 2011/0066718 A1 | 3/2011 | Susai et al. |
| 2011/0173295 A1 | 7/2011 | Bakke et al. |
| 2011/0282997 A1 | 11/2011 | Prince |
| 2011/0321122 A1 | 12/2011 | Mwangi et al. |
| 2012/0174196 A1 | 7/2012 | Bhogavilli |
| 2013/0212240 A1 | 8/2013 | Thornewell et al. |
| 2015/0052252 A1 | 2/2015 | Gilde et al. |
| 2015/0089579 A1* | 3/2015 | Manza ................. H04L 63/20 726/1 |
| 2015/0096020 A1 | 4/2015 | Adams |
| 2015/0121060 A1 | 4/2015 | Mimms et al. |
| 2015/0269369 A1* | 9/2015 | Hamid ................. G06F 9/4401 726/5 |
| 2016/0094546 A1* | 3/2016 | Innes ................... H04L 63/0815 713/156 |
| 2017/0068814 A1* | 3/2017 | Childress ............. H04L 63/062 |
| 2017/0188232 A1* | 6/2017 | Raleigh ................ H04L 63/20 |
| 2017/0337361 A1* | 11/2017 | Zhou ................... G06F 21/31 |
| 2018/0198786 A1* | 7/2018 | Shah ................... H04W 12/0608 |

FOREIGN PATENT DOCUMENTS

| | | |
|---|---|---|
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |

(56) References Cited

FOREIGN PATENT DOCUMENTS

| | | |
|---|---|---|
| WO | WO 99/64967 | 12/1999 |
| WO | WO 00/04422 | 1/2000 |
| WO | WO 00/04458 | 1/2000 |

OTHER PUBLICATIONS

"Big-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.
"Servlet/Applet/HTML authentication process with single sign-on," Research Disclosure 429128, Jan. 2000, pp. 163-164, IBM Corporation.
"Traffic Surges; Surge Queue; Netscaler Defense," 2005, PowerPoint Presentation, . slides 1-12, Citrix Systems, Inc.
"Windows Server 2003 Kerberos Extensions," Microsoft TechNet, 2003 (Updated Jul. 31, 2004), http://technet.microsoft.com/en-us/library/cc738207, Microsoft Corporation.
Abad, Cristina L., and Rafael I. Bonilla. "An analysis on the schemes for detecting and preventing Arp cache poisoning attacks." Distributed Computing System Workshops, 2007. ICDCSW'07. 27th International Conference on. IEEE, 2007.
ColonelPanic: Browser plugins vs extension—the difference, retrieved from http://colonelpanic.net/2010/08browser-plugins-vs-extensions-the-difference, Aug. 10, 2010.
Crescendo Networks, "Application Layer Processing (ALP)," 2003-2009, pp. 168-186, Chapter 9, CN-5000E/5500E, Foxit Software Company.
Dhamija et al: "The battle against phishing: dynamic security skins"—Symposium on Usable Privacy and Security, (SOUPS), Jul. 6-8, 2005, Pittsburgh, PA. USA.
F5 Networks Inc., "Configuration Guide for Local Traffic Management," F5 Networks Inc., Jan. 2006, version 9.2.2, 406 pgs.
F5 Networks, Inc., "Big-IP Application Security Manager: Getting Started", Manual, Jan. 27, 2014, pp. 1-76, Version 11.5.
F5 Networks, Inc., "Big-IP ASM 11.5.4", Release Notes, Apr. 12, 2016, Version 11.5.4.
F5 Networks, Inc., "Big-IP TMOS: Concepts", Manual, May 1, 2014, pp. 1-148, Version 11.5.
F5 Networks, Inc., "Big-IP TMOS Implementations", Manual, Mar. 19, 2015, pp. 1-288, Version 11.5.1.
F5 Networks, Inc., "Big-Ip® Application Security Manager Operations Guide", Jul. 2016, pgs. 1-181, F5 Networks, Inc.
F5 Networks, Inc., "Big-IP® Application Security Manager: Getting Started™" Aug. 25, 2014, pP. 1-78, version 11.6, F5 Networks, Inc.
F5 Networks, Inc., "Big-IP® Application Security Manager: Implementations™", Aug. 25, 2014, pp. 1-420, version 11.6, F5 Networks, Inc.
F5 Networks, Inc., "Big-IP® Local Traffic Management: Basics", Aug. 25, 2014, pp. 1-74, version 11.6, F5 Networks, Inc.
F5 Networks, Inc., "F5 Big-IP TMOS: Operations Guide", Manual, Nov. 2015, pp. 1-279.
F5 Networks, Inc., "Traffic Management Shell (tmsh) Reference Guide", Manual, Mar. 4, 2014, pp. 1-2394, Version 11.5.1.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Hochmuth, Phil, "F5, CacheFlow pump up content-delivery lines," Network World Fusion, May 4, 2001, 1 page, Las Vegas, Nevada.
Kevin Borders, Atul Prakash: "Web Tap: detecting covert web traffic"—Proceeding of the 11th ACM conference on Computer and Communications Security CCS'04, pp. 110-120, New York, 2004.
Macvittie, Lori, "Message-Based Load Balancing," Technical Brief, Jan. 2010, pp. 1-9, F5 Networks, Inc.
Mehra et al. Mitigating Denial of Service attack using CAPCHA Mechanism, 2011.
Schaefer, Ken, "Its and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Williams et al., "The Ultimate Windows Server 2003 System Administrator's Guide: Forwarding Authentication," 2003, 2 pages, Figure 10.7, Addison-Wesley Professional, Boston, Massachusetts.
=5 Networks Inc., "Big-IP APM 12.1.0", Release Notes, Apr. 20, 2017, pp. 1-36, F5 Networks, Inc., Retrieved from the Internet:<https://support.f5.com/kb/en-us/products/big-ip_apm/releasenotes/product/relnote-apm-12-1-0.html>.
=5 Networks Inc., "Big-IP® Access Policy Manager®: Authentication and Single Sign-On", Manual, May 18, 2016, pp. 1-332, vol. 12.1, F5 Networks, Inc., Retrieved from the Internet:<https://support.f5.com/kb/en-us/products/Dig-ip_apm/manuals/product/apm-authentication-single-sign-on-12-1-0.html>.
=5 Networks Inc., "Big-IP® Access Policy Manager®: Implementations", Manual, May 18, 2016, pp. 1-168, vol. 12.1, F5 Networks, Inc., Retrieved from the Internet:<https://support.f5.com/kb/en-us/products/big-ip_apm/manuals/product/apm-implementations-12-1-0.html>.
F5 Networks Inc., "F5 Big-IP Access Policy Management Operations Guide", Manual, May 5, 2015, pp. 1-172, F5 Networks, Inc., Retrieved from the Internet:<https://support.f5.com/kb/en-us/products/big-ip_apm/manuals/product/f5-apm-operations-guide.html>.

* cited by examiner

US 10,791,119 B1

METHODS FOR TEMPORAL PASSWORD INJECTION AND DEVICES THEREOF

This application claims the benefit of U.S. Provisional Patent Application Ser. No. 62/470,909 filed Mar. 14, 2017, which is hereby incorporated by reference in its entirety.

BACKGROUND

Policies in many networks restrict the use of passwords as a login method. However, such networks often have legacy or other applications that require passwords and are not capable of performing other types of authentication, such as certificate-based authentication.

Application servers hosting such applications generally utilize a directory service in order to authenticate users based on received passwords or other credentials. The directories may be selected from a list provided by an operating system of the application servers. Due to the manner in which directories are selected and/or the arrangement of devices in a network, intermediary devices may not be able to intercept communications between the application servers and the directory infrastructure.

Such intermediary devices include network traffic management devices that are often disposed between client devices and application servers in order to manage (e.g., balance or accelerate) the network traffic exchanged between those devices. When network traffic management devices cannot guarantee interception of directory service requests, those devices cannot simply authenticate clients on behalf of application servers and provide a result in response to such directory service requests.

SUMMARY

A method for temporal password injection implemented by a network traffic management system comprising one or more network traffic management apparatuses, application servers, client devices, global catalog servers, or directory servers, the method including determining when a client is authenticated in response to a received request from the client to log into an application hosted by an application server. One or more attributes are extracted from the request, when the determining indicates that the client is authenticated. A first password is generated for the client. A record for the client, stored at a global catalog server, is identified based on the extracted attributes. The generated first password is injected into the identified record. One or more credentials, including at least the generated first password, are then sent to the application hosted by the application server.

A network traffic management apparatus, comprising memory comprising programmed instructions stored thereon and one or more processors configured to be capable of executing the stored programmed instructions to determine when a client is authenticated in response to a received request from the client to log into an application hosted by an application server. One or more attributes are extracted from the request, when the determining indicates that the client is authenticated. A first password is generated for the client. A record for the client, stored at a global catalog server, is identified based on the extracted attributes. The generated first password is injected into the identified record. One or more credentials, including at least the generated first password, are then sent to the application hosted by the application server.

A non-transitory computer readable medium having stored thereon instructions for temporal password injection comprising executable code which when executed by one or more processors, causes the processors to determine when a client is authenticated in response to a received request from the client to log into an application hosted by an application server. One or more attributes are extracted from the request, when the determining indicates that the client is authenticated. A first password is generated for the client. A record for the client, stored at a global catalog server, is identified based on the extracted attributes. The generated first password is injected into the identified record. One or more credentials, including at least the generated first password, are then sent to the application hosted by the application server.

A network traffic management system, comprising one or more network traffic management apparatuses, application servers, client devices, global catalog servers, or directory servers, the network traffic management system comprising memory comprising programmed instructions stored thereon and one or more processors configured to be capable of executing the stored programmed instructions to determine when a client is authenticated in response to a received request from the client to log into an application hosted by an application server. One or more attributes are extracted from the request, when the determining indicates that the client is authenticated. A first password is generated for the client. A record for the client, stored at a global catalog server, is identified based on the extracted attributes. The generated first password is injected into the identified record. One or more credentials, including at least the generated first password, are then sent to the application hosted by the application server.

This technology has a number of associated advantages including providing methods, non-transitory computer readable media, network traffic management apparatuses, and network traffic management systems that facilitate temporal password injection. More specifically, this technology advantageously utilizes client certificate authentication as a proxy for applications that require password-based authentication but are hosted in networks that restrict passwords as an authentication method.

DETAILED DESCRIPTION

Figure 1:
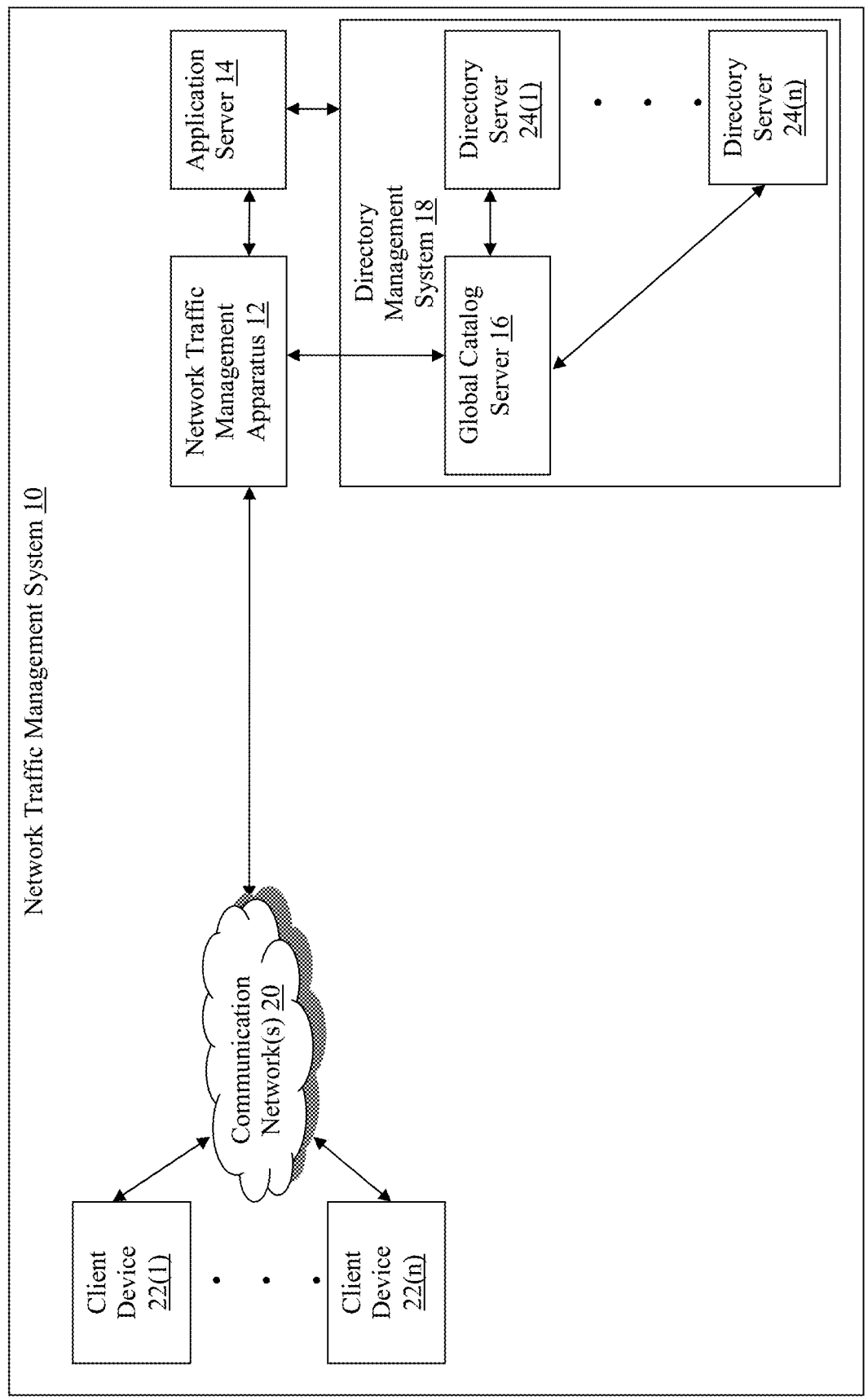
FIG. 1 is a block diagram of an exemplary network traffic management system with a network traffic management apparatus.

Referring to FIG. 1, an exemplary network environment that incorporates an exemplary network traffic management system 10 is illustrated. The network traffic management system 10 in this example includes a network traffic management apparatus 12 that is coupled to an application server 14, a global catalog server 16 of a directory management system 18, and, via communication network(s) 20, a plurality of client devices 22(1)-22(n), although the network traffic management apparatus 12, application server 14, global catalog server 16, and/or client devices 22(1)-22(n) may be coupled together via other topologies. The directory management system 18 in this example further includes a plurality of directory servers 24(1)-24(n) that are coupled to the global catalog server 16 and, along with the global catalog server 16, form a synchronized directory infrastructure. The network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that leverage client certificate authentication, for example, to facilitate password-based login for applications.

Figure 2:
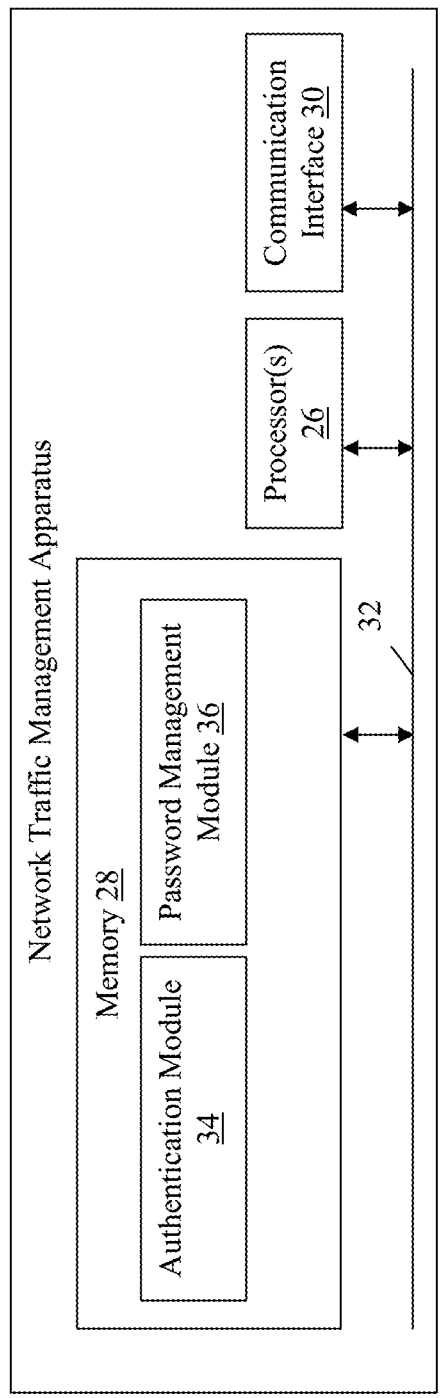
FIG. 2 is a block diagram of an exemplary network traffic management apparatus.

Referring to FIGS. 1-2, the network traffic management apparatus 12 may perform any number of functions including managing network traffic, accelerating network traffic associated with web applications hosted by the application server 14, and/or providing authentication, authorization, and accounting (AAA) services, for example. The network traffic management apparatus 12 includes one or more processors 26, a memory 28, and/or a communication interface 30, which are coupled together by a bus 32 or other communication link, although the network traffic management apparatus 12 can include other types and/or numbers of elements in other configurations.

The processor(s) 26 of the network traffic management apparatus 12 may execute programmed instructions stored in the memory 28 of the network traffic management apparatus 12 for the any number of the functions identified above. The processor(s) 26 of the network traffic management apparatus 12 may include one or more CPUs or general purpose processors with one or more processing cores, for example, although other types of processor(s) can also be used.

The memory 28 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 26, can be used for the memory 28.

Accordingly, the memory 28 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 28 of the network traffic management apparatus 12 includes an authentication module 34 and a password management module 36, although the memory 28 can include other policies, modules, databases, or applications, for example. The authentication module 34 is configured to provide AAA services in response to received login requests that are received from the client devices 22(1)-22(n). In this example, the login requests include certificates (e.g., public key infrastructure (PKI) certificates) associated with a smart card login process, although the authentication module 34 can be configured to authenticate other types or number of login requests based on other protocols (e.g., RADIUS or SAML).

The password management module 36 in this example generates a temporal password subsequent to authenticating one of the client devices 22(1)-22(n), injects the password into a record at the global catalog server 16, and sends credentials including the password to the application server 14. The injected passwords are propagated by the global catalog server 16 to the directory servers 24(1)-24(n) to enable the application server 14 to authenticate a user of the one of the client devices 22(1)-22(n) using any of the devices in the directory management system 18. Advantageously, the network traffic management apparatus 12 provides certificate-based authentication while the application server 14 authenticates clients using a password and directory service, as described and illustrated in more detail later.

The communication interface 30 of the network traffic management apparatus 12 operatively couples and communicates between the network traffic management apparatus 12, the application server 14, the global catalog server 16, and/or the client devices 22(1)-22(n), which are all coupled together by the communication network(s) 20 or direct connections, although other types and/or numbers of communication networks or systems with other types and/or numbers of connections and/or configurations to other devices and/or elements can also be used.

By way of example only, the communication network(s) 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 can also include direct connection(s) (e.g., for when a device illustrated in FIG. 1, such as the network traffic management apparatus 12, one or more of the client devices 22(1)-22(n), the application server 14, or one or more devices of the directory management system 18 operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such the application server 14, for example. Moreover, one or more of the devices of the network traffic management apparatus 12 in these examples can be in a same or a different communication network including one or more public, private, or cloud networks, for example.

The global catalog server 16 of the directory management system 18 in this example includes one or more processors, a memory, and a communication interface, which are coupled together by a bus or other communication link, although other numbers and/or types of network devices could be used. The global catalog server 16 stores objects or records for users of the client devices 22(1)-22(n) that are authorized to access various applications hosted by the application server 14. The records are associated with a directory service, such as an active directory domain service, for example. The global catalog server 16 is configured to propagate record updates to the directory servers 24(1)-24(n), as well as periodically receive updates from the directory servers 24(1)-24(n) to records stored at the directory servers 24(1)-24(n).

Each of the directory servers 24(1)-24(n) of the directory management system 18 in this example also includes one or more processors, a memory, and a communication interface, which are coupled together by a bus or other communication link, although other numbers and/or types of network devices could be used. One or more of the directory servers 24(1)-24(n) may be located in different physical sites or data centers and, as explained earlier, stores records that are synchronized with the global catalog server 16 and facilitate authentication of credentials for users of applications hosted by the application server 14. Accordingly, record updates that occur at a particular one of the directory servers 24(1)-24(n) are periodically propagated to the global catalog server 16 and each of the directory servers 24(1)-24(n) receives record updates initiated at the global catalog server 16.

The application server 14 in this example includes one or more processors, a memory, and a communication interface, which are coupled together by a bus or other communication link, although other numbers and/or types of network devices could be used. The application server 14 in this example processes requests received from the client devices 22(1)-22(n) via the communication network(s) 20 according to the HTTP-based application RFC protocol, for example. The requests received from the client devices 22(1)-22(n) are directed to hosted applications configured to utilize the directory management system 18 to authenticate users of the client devices 22(1)-22(n) based on received credentials. Various applications may be operating on the application server 14 and transmitting data (e.g., files or Web pages) to the client devices 22(1)-22(n) in response to requests from the client devices 22(1)-22(n). The application server 14 may be hardware or software or may represent a system with multiple servers in a pool, which may include internal or external networks.

Although the application server 14 is illustrated as a single device, one or more actions of the application server 14 may be distributed across one or more distinct network computing devices that together comprise the application server 14. Moreover, the application server 14 is not limited to a particular configuration. Thus, the application server 14 may contain a plurality of network computing devices that operate using a master/slave approach, whereby one of the network computing devices of the application server 14 operate to manage and/or otherwise coordinate operations of the other network computing devices. The application server 14 may operate as a plurality of network computing devices within a cluster architecture, a peer-to peer architecture, virtual machines, or within a cloud architecture, for example.

The client devices 22(1)-22(n) in this example include any type of computing device that can request and receive web content, such as mobile computing devices, desktop computing devices, laptop computing devices, tablet computing devices, virtual machines (including cloud-based computers), or the like. Each of the client devices 22(1)-22(n) in this example includes a processor, a memory, and a communication interface, which are coupled together by a bus or other communication link, although other numbers and/or types of network devices could be used.

The client devices 22(1)-22(n) may run interface applications, such as standard web browsers or standalone client applications, which may provide an interface to make requests for, and receive content stored on, the application server 14 via the communication network(s) 20. The client devices 22(1)-22(n) may further include a display device, such as a display screen or touchscreen, and/or an input device, such as a keyboard for example.

Although the exemplary network traffic management system 10 with the network traffic management apparatus 12, application server 14, client devices 22(1)-22(n), and directory management system 18 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, application server 14, client devices 22(1)-22(n), global catalog server 16, or directory servers 24(1)-24(n), for example, may be configured to operate as virtual instances on the same physical machine. In other words, one or more of the network traffic management apparatus 12, application server 14, global catalog server 16, or directory servers 24(1)-24(n) may operate on the same physical device rather than as separate devices communicating through communication network(s) or other types of connections. Additionally, there may be more or fewer network traffic management apparatuses, application servers, global catalog servers, directory servers, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
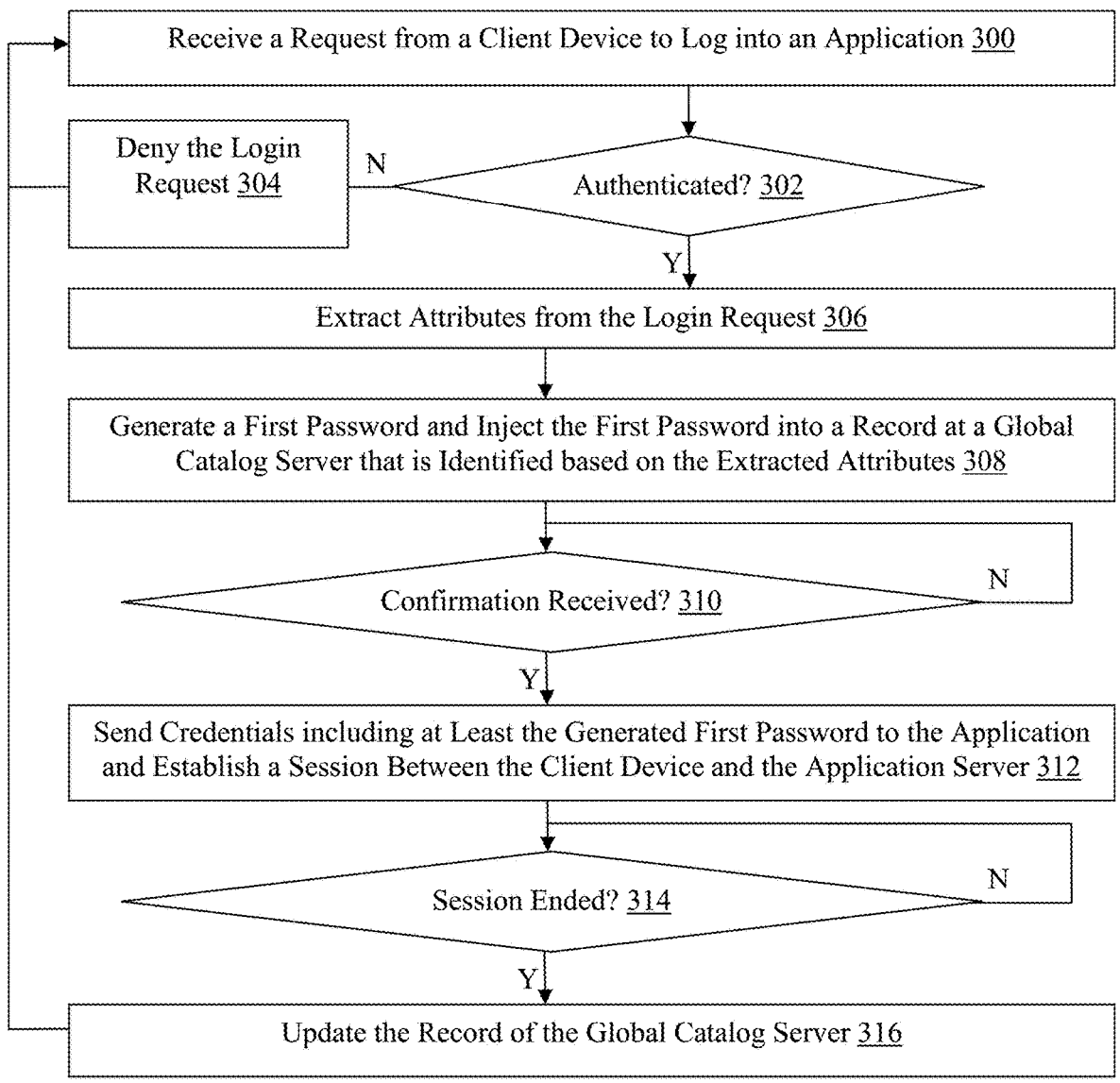
FIG. 3 is a flowchart of an exemplary method for temporal password injection.

Referring more specifically to FIG. 3, a flowchart of an exemplary method for temporal password injection is illustrated. In step 300 in this example, the network traffic management apparatus 12 receives a request from one of the client devices 22(1)-22(n) to log into an application hosted by the application server 14. The login request can result from use of a smart card and can include a certificate, for example, although other types of login requests using any number of protocols (e.g., RADIUS or SAML) can also be received in step 300 in other examples.

In step 302, the network traffic management apparatus 12 determines whether a user of the one of the client devices 22(1)-22(n) from which the login request was received in step 300 is authenticated. In this example, the network traffic management apparatus 12 can authenticate the user based on the certificate included with the login request. Accordingly, the network traffic management apparatus 12 can determine whether the certificate is issued or signed by a trusted certificate authority and whether the certificate is otherwise valid, for example. If the network traffic management apparatus 12 determines that the user is not authenticated, then the No branch is taken to step 304.

In step 304, the network traffic management apparatus 12 denies the login request such as by dropping the request or responding to the request with an indication that the login request was denied, for example. However, if in step 302 the network traffic management apparatus 12 determines that the user of the one of the client devices 22(1)-22(n) is authenticated, then the Yes branch is taken to step 306.

In step 306, the network traffic management apparatus 12 extracts attributes from the login request. In this particular example, the attributes can be extracted from the certificate included in the login request and can include a user name or employee ID, for example. Other types and/or number of attributes can also be extracted from the certificate or other portions of the login request in other examples.

In step 308, the network traffic management apparatus 12 generates a first password and injects the first password into a record stored at the global catalog server 16 of the directory management system 18. The first password can be any random combination of characters having any level of security that complies with any requirements of the application for which the login request received in step 300 was directed.

The record at the global catalog sever 16 into which the generated first password is injected corresponds with the user of the one of the client devices 22(1)-22(n) from which the login request was received in step 300. Accordingly, the record can be identified based on one or more of the attributes (e.g., user name or employee ID) extracted in step 306.

In step 310, the network traffic management apparatus 12 optionally determines whether a confirmation is received from the global catalog server 16 indicates that the global catalog server 16 successfully updated the record for the user of the one of the client devices 22(1)-22(n) to reflect the generated first password. Subsequent to updating the record, the global catalog server 16 will propagate the updated record to the director servers 24(1)-24(n) such that the records of the directory management system 18 are synchronized.

While the network traffic management apparatus 12 could inject the generated first password into the record for the user at one of the directory servers 24(1)-24(n), the synchronization of updated records from the directory servers 24(1)-24(n) to the global catalog server 16 is on the order of minutes in many networks, whereas the synchronization of updated records from the global catalog server 16 to the directory servers 24(1)-24(n) is effectively simultaneous. Accordingly, the global catalog server 16 can send a confirmation to the network traffic management apparatus 12 before or after initiating the synchronization of the updated record for the user to the remainder of the directory management system 18.

If the network traffic management apparatus 12 determines that a confirmation has not been received from the global catalog server 16, then the No branch is taken back to step 310 and the network traffic management apparatus 12 effectively waits for a confirmation to be received. However, if the network traffic management apparatus 12 determines that a confirmation has been received form the global catalog server 16, then the Yes branch is taken to step 312.

In step 312, the network traffic management apparatus 12 sends credentials including at least the generated first password to the application hosted by the application server 14 and to which the login request received in step 300 was directed. The credentials can include one or more of the attributes extracted in step 306 and can be sent to the application server 14 as a login request and in a manner that is expected by the application. Subsequent to receiving the credentials, the application server 14 will send an authentication request (e.g., an LDAP bind request) that includes the credentials to the directory management system 18.

Irrespective of whether the application server 14 selects the global catalog server 16 or one of the directory servers 24(1)-24(n) to direct the authentication request, the directory management system 18 will return a positive authentication result since the generated first password was previously injected into the user record in the directory management system 18 and will necessarily match the password included with the authentication request. Additionally, the application will be able to authenticate the user of the one of the client devices 22(1)-22(n) using the generated first password and irrespective of whether the authentication request is transmitted to the directory management system 18 through the network traffic management apparatus 12.

Subsequent to authenticating the user of the one of the client devices 22(1)-22(n) using the generated first password, the authentication server and the network traffic management apparatus 12 will establish a session to facilitate communications between the one of the client devices 22(1)-22(n) and the application hosted by the application server 14. In step 314, the network traffic management apparatus 12 determines whether the established session has ended. Accordingly, the network traffic management apparatus 12 in this example monitors the session between the one of the client devices 22(1)-22(n) and the application server 14 to determine whether the user a logged off, whether the session has timed out, or whether the session has expired, for example, although the determination regarding whether the session has ended can be based on other criteria in other examples.

If the network traffic management apparatus 12 determines that the session has not ended, then the No branch is taken back to step 314 and the network traffic management apparatus 12 effectively continues to monitor the session and wait for a determination that the session has ended. However, if the network traffic management apparatus 12 determines that the session has ended, then the Yes branch is taken to step 316.

In step 316, the network traffic management apparatus 12 optionally updates the record for the user of the one of the client devices 22(1)-22(n) at the global catalog server 16 to remove or replace the generated first password. In one example, the network traffic management apparatus 12 generates a second password and injects the second password into the record in order to replace the first password that was previously injected into the record as described and illustrated earlier with reference to step 308.

By deleting the first password or replacing the first password with the second password, the network traffic management apparatus 12 can ensure that the first password cannot be used (e.g., by a malicious third party) without a prior authentication. Subsequent to injecting the generated second password, the network traffic management apparatus 12 proceeds back to step 300, and one or more of steps 300-316 can be performed in parallel by the network traffic management apparatus 12 for any number of the client devices 22(1)-22(n).

Figure 4:
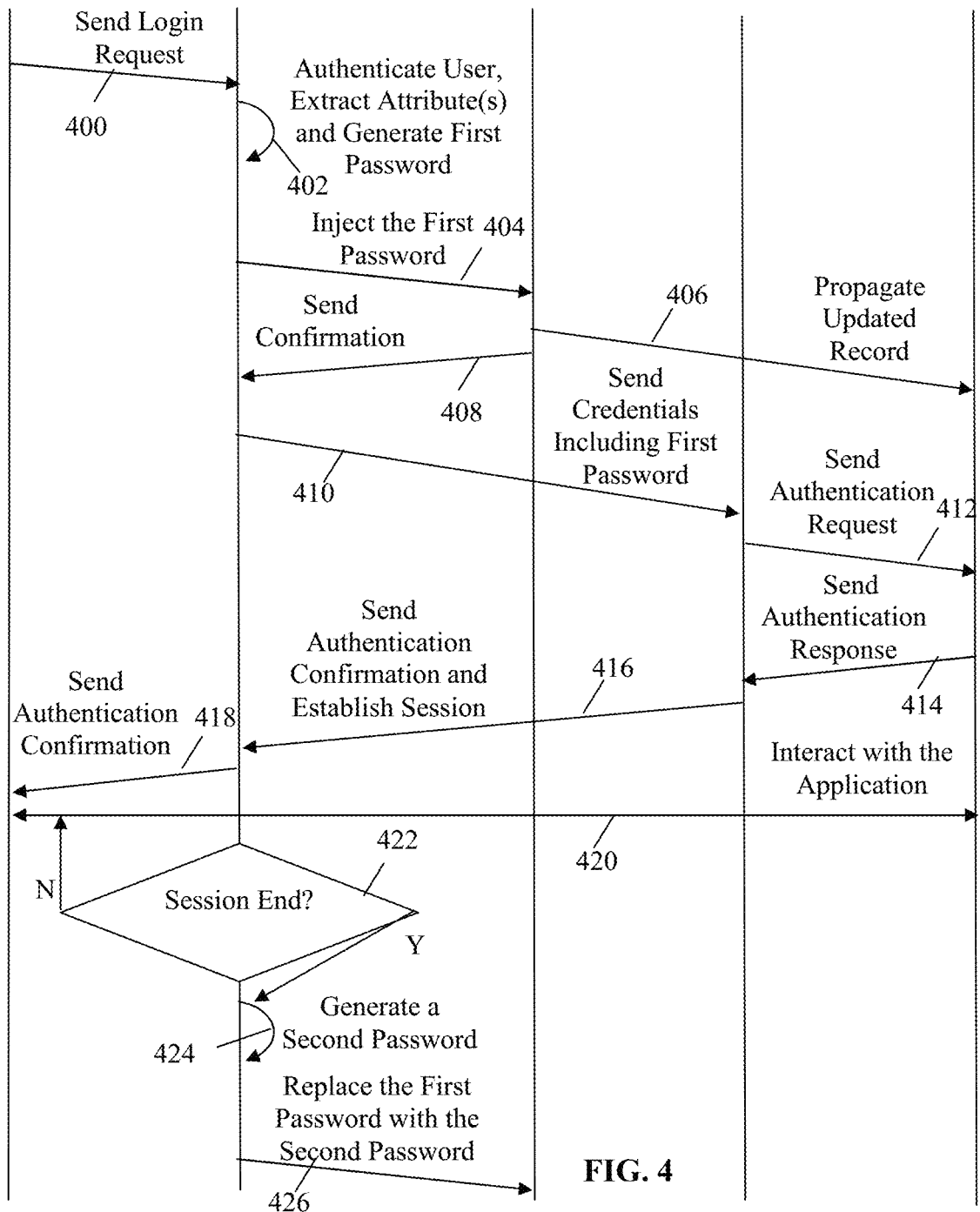
FIG. 4 is a timing diagram of an exemplary method for temporal password injection.

Referring more specifically to FIG. 4, a timing diagram of an exemplary method for temporal password injection is illustrated. In step 400 in this example, the client device 22 sends a login request to toward an application hosted by the application server 14, which is intercepted by the network traffic management apparatus 12. The login request can be initiated using a smart card and can include a certificate, for example, although other types of login requests initiated in other ways can also be sent by the client device 22.

In step 402, the network traffic management apparatus 12 authenticates a user of the client device 22, extracts one or more attributes from the login request (e.g., from a certificate included therewith), and generates a first password. The network traffic management apparatus 12 can perform a client certificate authentication, for example, although other types of authentication can also be performed. In another example in which the user cannot be authenticated, the network traffic management apparatus 12 can respond to the client device 22 with a denial of the login request and/or drop the login request, for example.

In step 404, the network traffic management apparatus 12 injects the first password into a record stored by the global catalog server 16. The record is identified based on the attributes extracted in step 402 and corresponds with a user of the client device 22.

In step 406, the global catalog server 16 propagates the updated record for the user of the client device 22 to the directory server 24 in order to maintain a synchronized directory infrastructure. In step 408, the global catalog server 18 sends a confirmation of receipt of the update to the record to the network traffic management apparatus 12. In other examples, steps 406 and 408 can occur in another order.

Following receipt of the confirmation from the global catalog server 18, the network traffic management apparatus 12 sends credentials for the user of the client device 22 to the application server in step 410. The credentials include at least the password generated in step 402, and optionally include one or more of the attributes extracted in step 402. The credentials can be sent as a login request to the application in a format and manner that complies with the requirements and/or expectations of the application.

In step 412, the application server 14 sends an authentication request to the directory server 24. The authentication request can include the credentials and the directory server 24 can be selected by the application server 14 from a list provided by an operating system of the application server 14, for example. In step 414, the directory server 24 sends an authentication response to the application server 14 that includes an authentication result. In this example, the directory server 24 will query the stored records to confirm that the credentials match a stored record corresponding to a valid and authenticated user. Since the password is previously injected into the corresponding record via the global catalog server 18 in step 404, the authentication result is necessarily positive.

In step 416, the application server 14 sends an authentication confirmation to the network traffic management apparatus 12 or otherwise indicates to the network traffic management apparatus 12 an acceptance of the credentials sent by the network traffic management apparatus 12 to the application server 14 in step 410. Additionally, the network traffic management apparatus 12 and application server 14 establish a session in step 416.

In step 418, the network traffic management apparatus 12 sends an authentication confirmation to the client device 22 in response to the login request received by the network traffic management apparatus 12 in step 400. In step 420, the client device 22 interacts with the application hosted by the application server 14 via the session established in step 416. In another example, step 420 can be performed at any time subsequent to the authentication of the user of the client device in step 402.

In step 422, the network traffic management apparatus 12 determines whether the session has ended based on a monitoring of the communications between the client device 22 and application server 14 exchanged in step 420. If the network traffic management apparatus 12 determines that the session has not ended, then the No branch is taken and the network traffic management apparatus 12 continues monitoring the session.

However, if the network traffic management apparatus 12 determines that the session has ended, then the Yes branch is taken to step 424. In step 424, the network traffic management apparatus 12 optionally generates a second password.

In step 426, the network traffic management apparatus 12 replaces the first password in the record for the user of the client device 22, which is stored at the global catalog server 18, with the second password in order to restrict subsequent use of the first password without a prior authentication. In other examples, the first password in the record can be deleted and other methods of restricting subsequent use of the first password can also be used.

With this technology, network traffic management apparatuses can facilitate authentication for applications that require password-based authentication but reside in networks that restrict password use. Advantageously, this technology does not require steering of authentication requests through any intermediary network traffic management apparatuses. Accordingly, client certificate authentication, for example, can be used as a proxy for password-based authentication utilized by legacy and other applications in order to maintain user access to those applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for network security implemented by a network traffic management system comprising one or more network traffic management apparatuses, server devices, or client devices, the method comprising:
   authenticating a client based on a certificate included in a first request received from the client to log into an application;
   identifying a record for the authenticated client stored at a catalog server based on a match in the identified record of one or more attributes extracted from the first request;
   generating a first password for the authenticated client;
   injecting the generated first password into the identified record for the authenticated client prior to communicating with the application on behalf of the authenticated client;
   sending one or more credentials including at least one or more of the extracted attributes and the generated first password in a generated second request to log in to the application, without returning the generated first password to the authenticated client; and
   establishing a session with the application, following receipt of an authentication confirmation from the application in response to the second request, to facilitate access to the application on behalf of the authenticated client.

2. The method of claim 1, further comprising extracting the attributes from the certificate.

3. The method of claim 1, further comprising:
   determining when a record update confirmation is received from the catalog server subsequent to injecting the generated first password into the identified record; and
   delaying the sending of the credentials to the application until the determination indicates that the record update confirmation is received from the catalog server.

4. The method of claim 1, further comprising:
   monitoring the session to determine when the session has ended; and
   generating a second password and replacing the generated first password in the identified record with the generated second password, when the determination indicates that the session has ended.

5. A network traffic management apparatus, comprising memory comprising programmed instructions stored thereon and one or more processors configured to execute the stored programmed instructions to:
   authenticate a client based on a certificate included in a first request received from the client to log into an application;
   identify a record for the authenticated client stored at a catalog server based on a match in the identified record of one or more attributes extracted from the first request;
   generate a first password for the authenticated client;
   inject the generated first password into the identified record for the authenticated client prior to communicating with the application on behalf of the authenticated client;
   send one or more credentials including at least one or more of the extracted attributes and the generated first password in a generated second request to log in to the application, without returning the generated first password to the authenticated client; and
   establish a session with the application, following receipt of an authentication confirmation from the application in response to the second request, to facilitate access to the application on behalf of the authenticated client.

6. The network traffic management apparatus of claim 5, wherein the one or more processors are further configured to execute the stored programmed instructions to extract the attributes from the certificate.

7. The network traffic management apparatus of claim 5, wherein the one or more processors are further configured to execute the stored programmed instructions to:
   determine when a record update confirmation is received from the catalog server subsequent to injecting the generated first password into the identified record; and
   delay the sending of the credentials to the application until the determination indicates that the record update confirmation is received from the catalog server.

8. The network traffic management apparatus of claim 5, wherein the one or more processors are further configured to execute the stored programmed instructions to:
   monitor the session to determine when the session has ended; and
   generate a second password and replacing the generated first password in the identified record with the generated second password, when the determination indicates that the session has ended.

9. A non-transitory computer readable medium having stored thereon instructions for temporal password injection comprising executable code which when executed by one or more processors, causes the one or more processors to:
   authenticate a client based on a certificate included in a first request received from the client to log into an application;
   identify a record for the authenticated client stored at a catalog server based on a match in the identified record of one or more attributes extracted from the first request;
   generate a first password for the authenticated client;
   inject the generated first password into the identified record for the authenticated client prior to communicating with the application on behalf of the authenticated client;
   send one or more credentials including at least one or more of the extracted attributes and the generated first password in a generated second request to log in to the application, without returning the generated first password to the authenticated client; and
   establish a session with the application, following receipt of an authentication confirmation from the application in response to the second request, to facilitate access to the application on behalf of the authenticated client.

10. The non-transitory computer readable medium of claim 9, wherein the executable code when executed by the one or more processors further causes the one or more processors to extract the attributes from the certificate.

11. The non-transitory computer readable medium of claim 9, wherein the executable code when executed by the one or more processors further causes the one or more processors to:
 determine when a record update confirmation is received from the catalog server subsequent to injecting the generated first password into the identified record; and
 delay the sending of the credentials to the application until the determination indicates that the record update confirmation is received from the catalog server.

12. The non-transitory computer readable medium of claim 9, wherein the executable code when executed by the one or more processors further causes the one or more processors to:
 monitor the session to determine when the has ended; and
 generate a second password and replacing the generated first password in the identified record with the generated second password, when the determination indicates that the session has ended.

13. A network traffic management system, comprising one or more network traffic management apparatuses, server devices, or client devices with memory comprising programmed instructions stored thereon and one or more processors configured execute stored programmed instructions to:
 authenticate a client based on a certificate included in a first request received from the client to log into an application;
 identify a record for the authenticated client stored at a catalog server based on a match in the identified record of one or more attributes extracted from the first request;
 generate a first password for the authenticated client;
 inject the generated first password into the identified record for the authenticated client prior to communicating with the application on behalf of the authenticated client;
 send one or more credentials including at least one or more of the extracted attributes and the generated first password in a generated second request to log in to the application, without returning the generated first password to the authenticated client; and
 establish a session with the application, following receipt of an authentication confirmation from the application in response to the second request, to facilitate access to the application on behalf of the authenticated client.

14. The network traffic management system of claim 13, wherein the one or more processors are further configured to execute the stored programmed instructions to extract the attributes from the certificate.

15. The network traffic management system of claim 13, wherein the one or more processors are further configured to execute the stored programmed instructions to:
 determine when a record update confirmation is received from the catalog server subsequent to injecting the generated first password into the identified record; and
 delay the sending of the credentials to the application until the determination indicates that the record update confirmation is received from the catalog server.

16. The network traffic management system of claim 13, wherein the one or more processors are further configured to execute the stored programmed instructions to:
 monitor the session to determine when the session ended; and
 generate a second password and replacing the generated first password in the identified record with the generated second password, when the determination indicates that the session has ended.

17. The method of claim 1, wherein the attributes included in the credentials comprise one or more of a user name or an employee identifier and the method further comprises sending another authentication confirmation to the client in response to the first request and following receipt of an authentication confirmation from the application in response to the second request.

18. The network traffic management apparatus of claim 5, wherein the attributes included in the credentials comprise one or more of a user name or an employee identifier and the one or more processors are further configured to execute the stored programmed instructions to send another authentication confirmation to the client in response to the first request and following receipt of an authentication confirmation from the application in response to the second request.

19. The non-transitory computer readable medium of claim 9, wherein the attributes included in the credentials comprise one or more of a user name or an employee identifier and the executable code when executed by the one or more processors further causes the one or more processors to send another authentication confirmation to the client in response to the first request and following receipt of an authentication confirmation from the application in response to the second request.

20. The network traffic management system of claim 13, wherein the attributes included in the credentials comprise one or more of a user name or an employee identifier and the one or more processors are further configured to execute the stored programmed instructions to send another authentication confirmation to the client in response to the first request and following receipt of an authentication confirmation from the application in response to the second request.

\* \* \* \* \*